United States Patent [19]

Plaisier

[11] Patent Number: 4,968,424
[45] Date of Patent: Nov. 6, 1990

[54] BACKFLUSH FILTER ELEMENT

[76] Inventor: Leendert Plaisier, Kwakelkade 28, Alkmaar, Netherlands

[21] Appl. No.: 324,874

[22] Filed: Mar. 17, 1989

[30] Foreign Application Priority Data

Mar. 18, 1988 [NL] Netherlands ............. 8800675

[51] Int. Cl.$^5$ .............................. B01D 29/41
[52] U.S. Cl. ............................ 210/346; 210/461; 210/486; 55/492; 55/529
[58] Field of Search ............ 210/232, 238, 323.2, 210/346, 347, 461, 486; 55/492, 500, 505, 507, 529

[56] References Cited

U.S. PATENT DOCUMENTS

| 118,306 | 8/1871 | Vallnas | 210/346 |
| 1,099,212 | 6/1914 | Springer | 210/346 |
| 2,381,949 | 8/1945 | Goodloe et al. | 210/461 |
| 2,691,445 | 10/1954 | Eickemeyer | 210/346 |
| 2,916,144 | 12/1959 | Langnickel | 210/346 |
| 3,951,630 | 4/1976 | Kleissler, Jr. | 55/529 |
| 4,116,649 | 9/1978 | Cullen et al. | 55/529 |
| 4,343,149 | 8/1982 | Abthoff et al. | 55/529 |

Primary Examiner—Richard V. Fisher
Assistant Examiner—Wanda L. Millard
Attorney, Agent, or Firm—Pollock, Vande Sande & Priddy

[57] ABSTRACT

Filter element, formed by a supporting body with a filtration part and a connecting part extending therefrom, in which the filtration part has the form of a flat ellipse or a flat rhomb, from which the connecting part gradually extends to a rounder shape, while over the supporting body a filter bag has been applied which at the open end has been fastened onto the connecting part by means of a clamp device.

21 Claims, 4 Drawing Sheets

BACKFLUSH FILTER ELEMENT

BACKGROUND OF THE INVENTION

The present invention relates to a backflush filter element, in which the filter element is intended to be installed in a filter tank standing or depending on, from a filter plate or a mainfold, respectively and in which the filter element is formed by a supporting body with a filtration part and a connecting part extending therefrom, through which the filtrate may be discharged, while over this supporting body a filter medium has been applied.

The invention relates more in particular to a backflush filter element, in which the ratio between the filtration surface per meter of length of the filter element and the section of the filtrate discharge is between 285 and 680, and the filtrate surface is between the 0.07 m$^2$ and 0.46 m$^2$.

Such a backflush filter element is known in the shape of a filter candle.

This filter candle has a cylindrical shape, which has the disadvantage, that in the so-called candle filter, in which a number of filter candles have been installed in the filter tank, the ratio between the complete filtering surface of the joint candles and the volume of the filter tank is low.

SUMMARY OF THE INVENTION

The invention aims to obviate this drawback of the known back flush filter element.

The filter element according to the present invention is characterized in that the section of the filtration part has the shape of a flat ellipse or rhomb, from which the connecting part gradually widens to a more rounder shape.

It has appeared, that by the new shape of the backflush filter element, as compared to the cylindrical shape of the filter candle, a substantially larger filtration surface can be obtained per unit of volume of the filter tank.

So, by using the backflush filter element according to the invention, 57% more filtration surface per unit of the volume of the filter tank can be obtained as compared to the filter candle.

Besides in that the free space between the elements remains the same, the cake space by using the backflush filter element according to the invention may somewhat increase as compared to the filter candle.

According to a further feature of the filter element according to the invention, the largest ratio of thickness to width in the horizontal section of the filtration part is between 10 and 25%, and preferably 17%.

In an embodiment of the filter element according to the present invention, the filter medium has the shape of a filter bag of filter cloth, or of filter gauze of metal or synthetic material, or of sintered metal fibres or of filter membrane material.

Preferably this filter medium is deformable, making a dry cake discharge possible.

Favorably, according to one feature of the invented filter element, the outer peripheries of the filtration part and the connecting part of the supporting body are substantially equal to one another, such, that a filter bag, which has been applied fitly over the filtration part, and which has been sealed off rectilinearly at the lower side and being rectangular in downfolded state, may at its open end, while free of folds, be fastened onto the rounder connecting part by a clamp device, such as a clamp band, and thereby the filter medium evenly loading underneath the clamp device.

The filter element according to the invention may be set up in itself in a manner known, of a supporting body with supporting gauze, and over which the actual filter medium has been applied.

The supporting body may thereby be made out of various materials, such as synthetic material or metal, and in various ways, such as a casting or moulding.

In an embodiment of the invented filter element, the connecting part and the filtration part of the supporting body are made of metal plate, this metal plate at the filtration part being provided with perforations and a cover of support gauze for the discharge of the filtrate up to within the support body.

In an embodiment of the invented filter element a raising pipe for the filtrate discharge has been installed inside the supporting body and which may be flattened within the filtration part of the supporting body.

The invention will now be further explained with reference to the drawing of an embodiment by way of example.

DESCRIPTION OF THE PREFERRED EMBODIMENT

Figure 2:
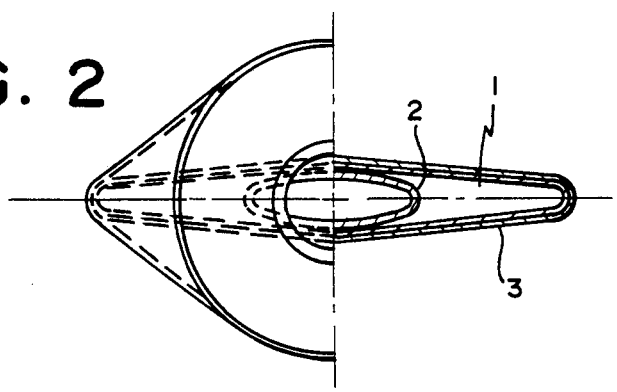
FIG. 2 is partly a top view, and partly a section of the filter element according to FIG. 1.
Figure 1:
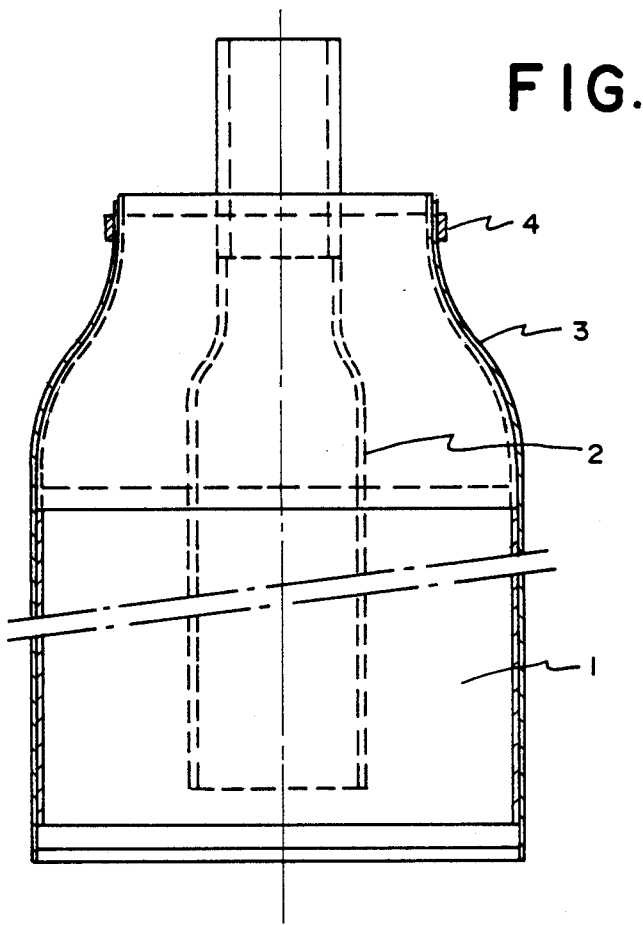
FIG. 1 is a side view of the filter element according to the present invention.

As can be seen in FIG. 1 and FIG. 2, the filtration part 1 of the element has a substantially rhomb-shaped section, and in which the flattened filtrate discharge pipe 2 has been taken up.

The flat rhomb-shape extends upwardly to a rounder periphery shape, in such a way, that a filter bag 3, which has been applied over the rhomb-shape of the element, fits onto the rounder periphery shape and which may be sealed off thereon by means of a clamp band 4. In the center of the top closure extends the raising pipe 2 for the filtrate discharge.

Figure 3:
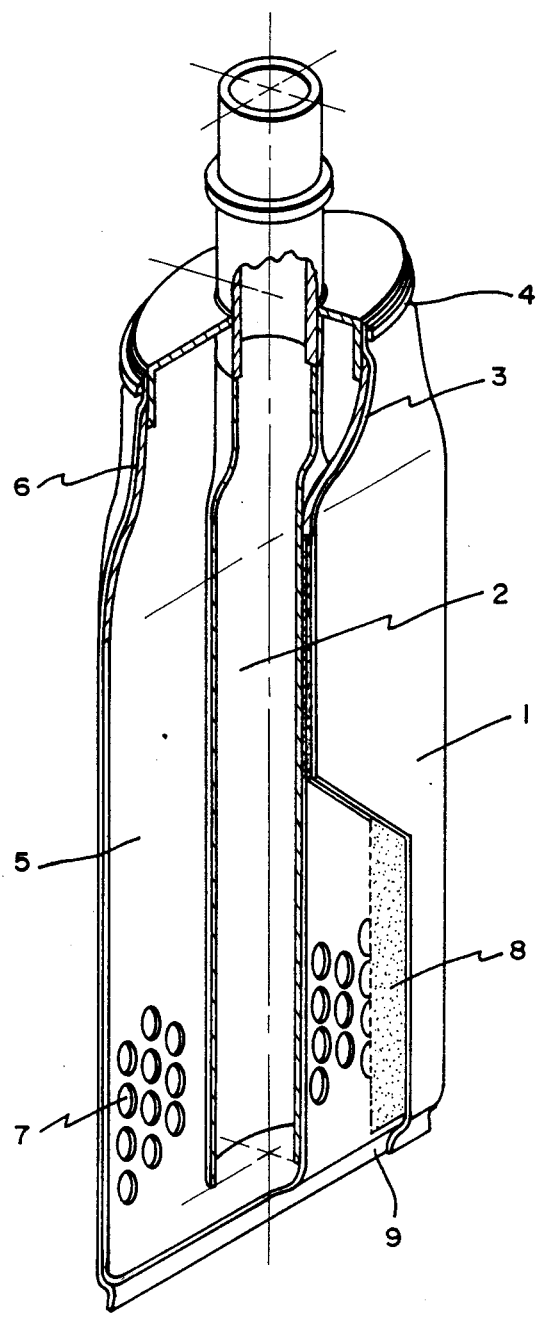
FIG. 3 is a perspective view of an embodiment of the invented filter element in partly worked open state.

As shown in FIG. 3, the filter element is formed by a supporting body with a filtration part 5 of steel plate with perforations 7, over which supporting gauze 8 has been applied and thereover the bag-shaped filter medium 3. Of the filtration part 5, of which the section has the shape of a flat ellipse, the opposed end portions 9 are bent over towards one another and are connected to one another by spot weldings. From the filtration part 5 the connecting part 6 extends gradually widening to a rounder shape, and on which the filter bag 3, which is sealed rectilinearly at its lower side, has been fastened with a clamp band 4. Inside the supporting body again a raising pipe 2 for the filtrate discharge has been mounted.

Figure 4:
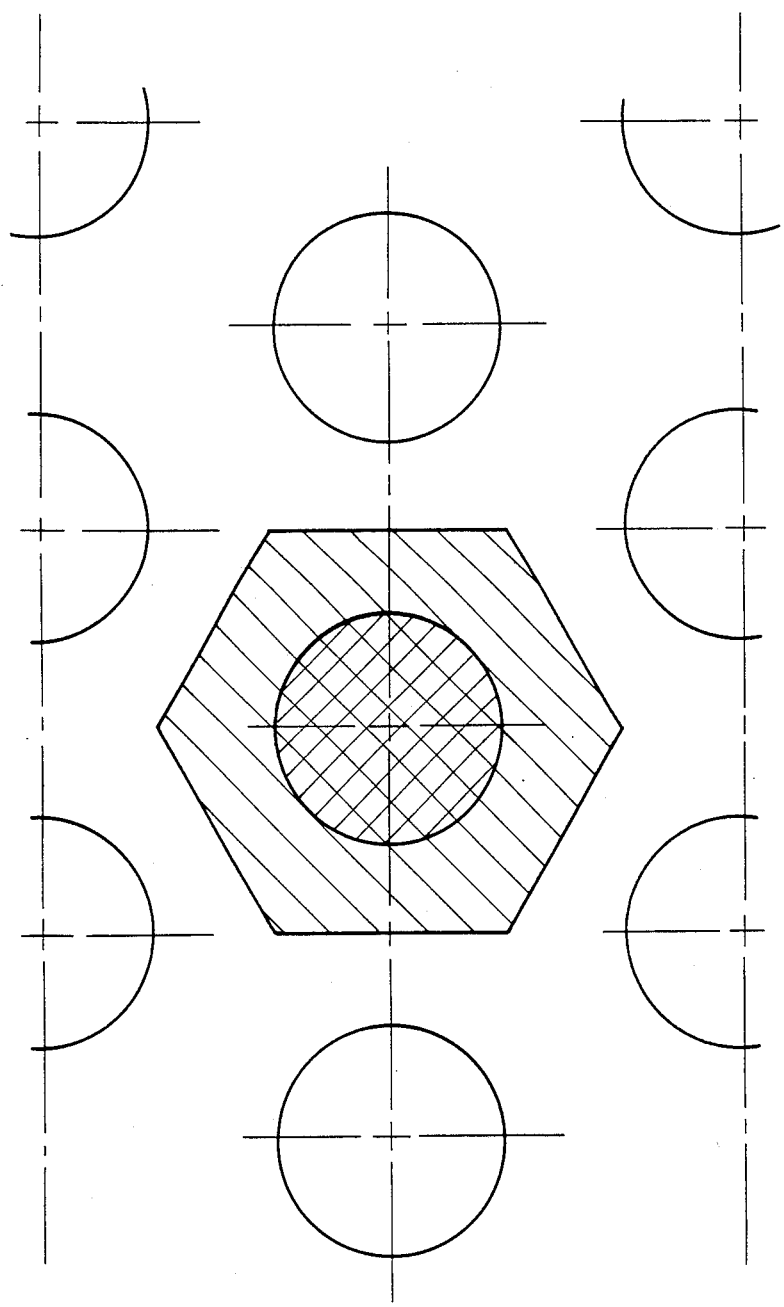
FIG. 4 is an arrangement of filter candles, such as this may take place in a filter tank.
Figure 5:
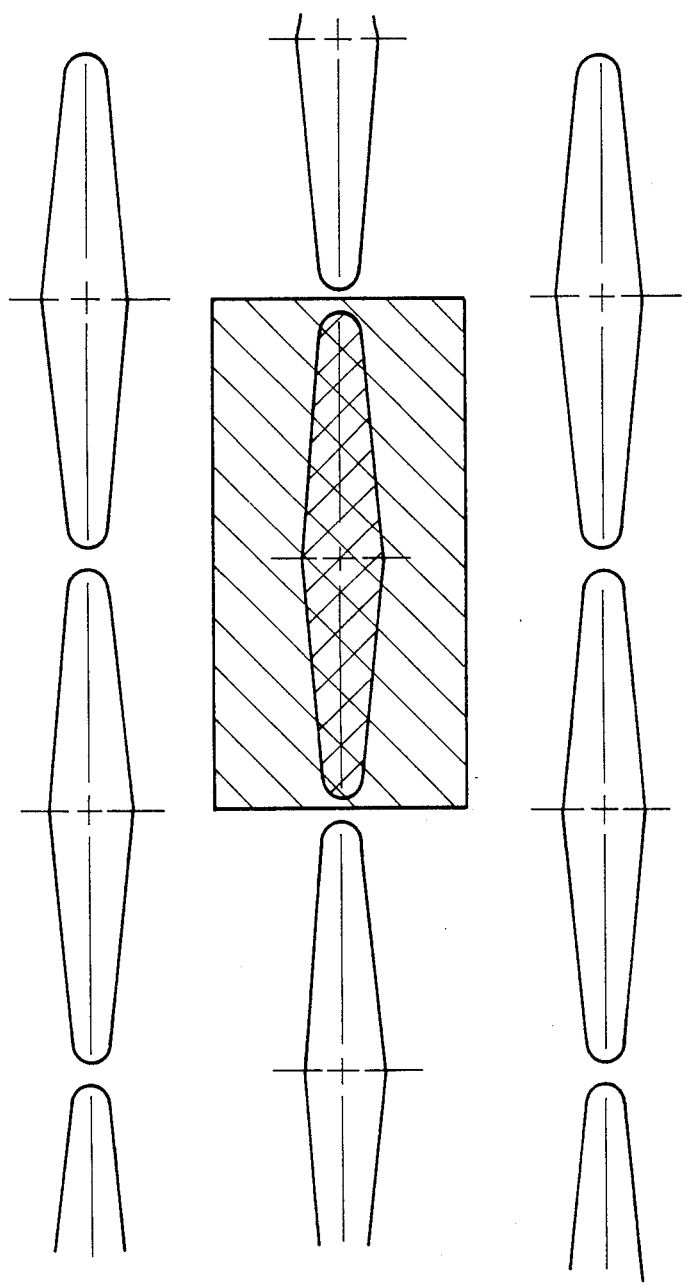
FIG. 5 is an arrangement of the filter elements according to the invention in a filter tank.

With reference to FIG. 3 and FIG. 4 the following comparison can be made of the cricket element, i.e. the filter element according to the invention, and the filter candle.

| (a) Filter candle: | 0 | = | 51 mm (2") |
| --- | --- | --- | --- |
|  | 1 | = | 1524 mm (60") |
|  | stitch | = | 91 mm triangle |
| Filter surface per candle | −0.244 |  | m2 |
| Surface section per candle | −2043 |  | mm2 |
| Surface section space per candle | −7172 |  | mm2 |
| Surface section free space per candle | −5129 |  | mm2 |
| (b) Cricket element: | section | = | 110 × 18,5 mm. |
|  | 1 | = | 1524 mm |
|  | stitch | = | 115 × 57.5 mm. |
| Filter surface per element | −0.354 |  | mm2 (plus 45%) |
| Surface section per element | −1452 |  | mm2. |
| Surface section space per element | −6613 |  | mm2 (−8%) |
| Surface section free space per element | −5161 |  | mm2 |

Result 1. 57% more filter surface / unit of volume of the filter casing.
2. Free space around the elements has remained the same.
3. Cake room is 44 mm instead of 40 mm.

I claim:

1. A backflush filter element, comprising:
   a hollow supporting member having a longitudinal axis and including along its longitudinal axis a filtration part and a connecting part extending from said filtration part, said supporting member having, along its longitudinal axis, a non-uniformly shaped cross-section in the direction transverse to the longitudinal axis, and a filter medium applied over said supporting member, wherein the width to thickness ratio at said filtration part is greater than at said connecting part, said ratio gradually decreasing along said longitudinal axis of said supporting member to become the smallest at the free open end of said connecting part, and wherein the outer periphery of the non-uniformly shaped cross-section is substantially constant along the longitudinal axis.

2. A backflush filter element according to claim 1, wherein said filtration part of said supporting member has been formed from a perforated metal plate with a supporting gauze for the discharge of the filtrate up within said support member.

3. A backflush filter element according to claim 2, wherein a raising pipe is mounted within said supporting member for the filtrate discharge.

4. A backflush filter element according to claim 3, wherein said raising pipe inside said filtration part has been flattened.

5. A backflush filter element according to claim 3, wherein in the cross-section of said filtration part, the largest ratio of thickness to width is between 10 and 25%.

6. A backflush filter element according to claim 2, wherein the opposite end portions of said metal plate of said filtration part are bent over towards one another and are connected to one another.

7. A backflush filter element according to claim 1, wherein a raising pipe is mounted within said supporting member for the filtrate discharge.

8. A backflush filter element according to claim 7, wherein said raising pipe inside said filtration part has been flattened.

9. A backflush filter element, according to claim 1, wherein the cross-section of said filtration part has the shape of a flat ellipse.

10. A backflush filter element, according to claim 1, wherein the cross-section of said filtration part has the shape of a rhomb.

11. A backflush filter element according to claim 1, wherein said filter medium has the shape of a filter bag and is constructed of one of filter cloth, gauze, metal, synthetic material, sintered metal fibers and filter membrane material.

12. A backflush filter element according to claim 1, wherein the outer peripheries of said filtration part and said connecting part of said supporting member are substantially equal to one another, such that a filter bag, which has been sealed off rectilinearly at the bottom side and which has been fitted tightly over said filtration part, may be fastened with a clamp device onto said connecting part at the open end.

13. A backflush filter element according to claim 1, wherein said connecting part is a metal plate.

14. A backflush filter element according to claim 1, wherein in the cross-section of said filtration part, the largest ratio of thickness to width is between 10 and 25%.

15. A backflush filter element, comprising:
   a hollow supporting member including in its longitudinal direction a filtration part at one end and a connecting part extending from said filtration part at the other end, and a filter medium applied over said supporting member;
   said supporting member having, along its longitudinal direction, a non-uniformly shaped cross-section transverse to its longitudinal direction, said supporting member including a substantially flat, oval cross-section at said filtration part, said cross-section widening to form a more rounded cross-section at the edge of said connecting part, wherein the outer periphery of said cross-section of said supporting member remains substantially constant along its longitudinal direction including said substantially oval and rounded cross-section.

16. A backflush filter element according to claim 15, wherein the outer peripheries of said filtration part and said connecting part of said supporting member are substantially equal to one another, such that a filter bag, which has been sealed off rectilinearly at the bottom side and which has been fitted tightly over said filtration part, may be fastened with a clamp device onto said connecting part at the open end.

17. A backflush filter element according to claim 16, wherein said connecting part is a metal plate.

18. A backflush filter element according to claim 17, wherein the opposite end portions of said metal plate of said filtration part are bent over towards one another and are connected to one another.

19. A backflush filter element, according to claim 15, wherein the cross-section of said filtration part has the shape of a flat ellipse.

20. A backflush filter element, according to claim 15, wherein the cross-section of said filtration part has the shape of a rhomb.

21. A backflush filter element according to claim 15, wherein in the cross-section of said filtration part, the largest ratio of thickness to width is between 10 and 25%.

* * * * *